Oct. 29, 1935.  R. F. METCALFE  2,019,315
CLUTCH OPERATING MECHANISM
Filed May 8, 1931  2 Sheets-Sheet 1
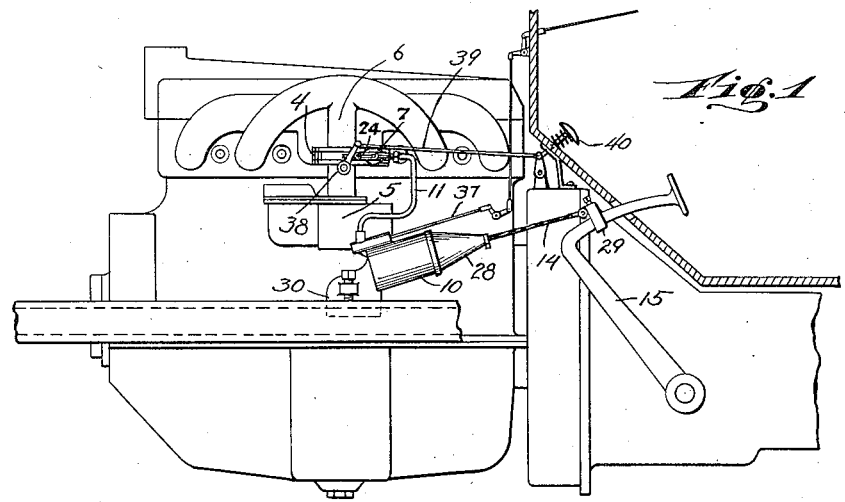
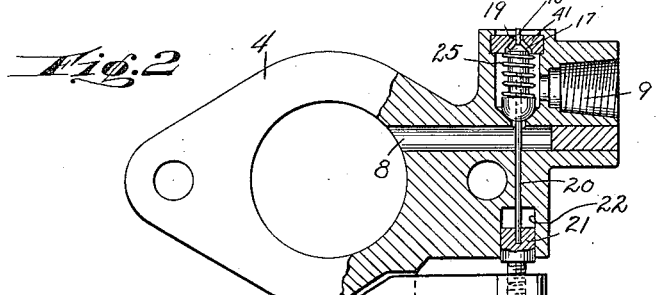
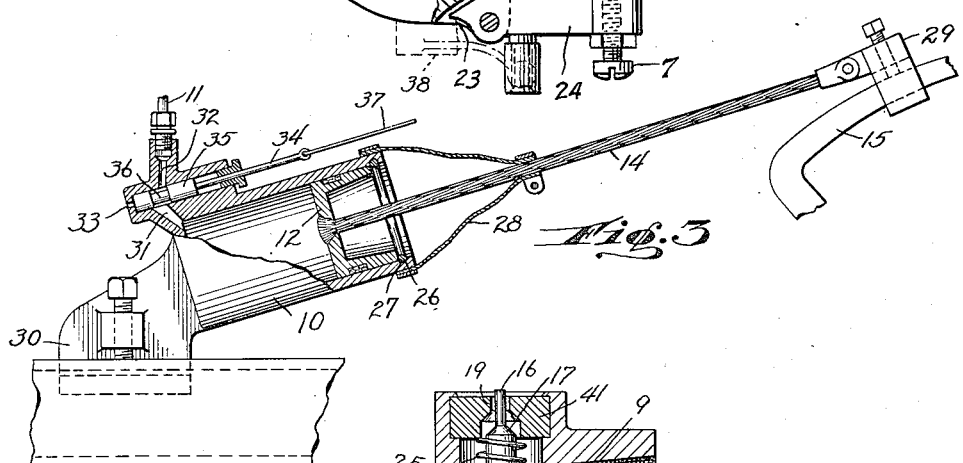
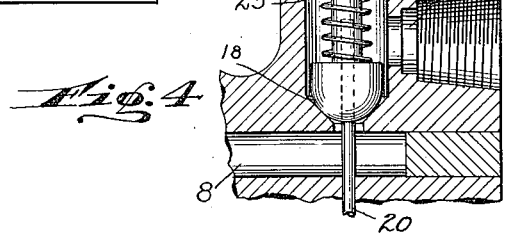
INVENTOR.
ROBERT F. METCALFE.
BY
Austin + Dix
ATTORNEYS.

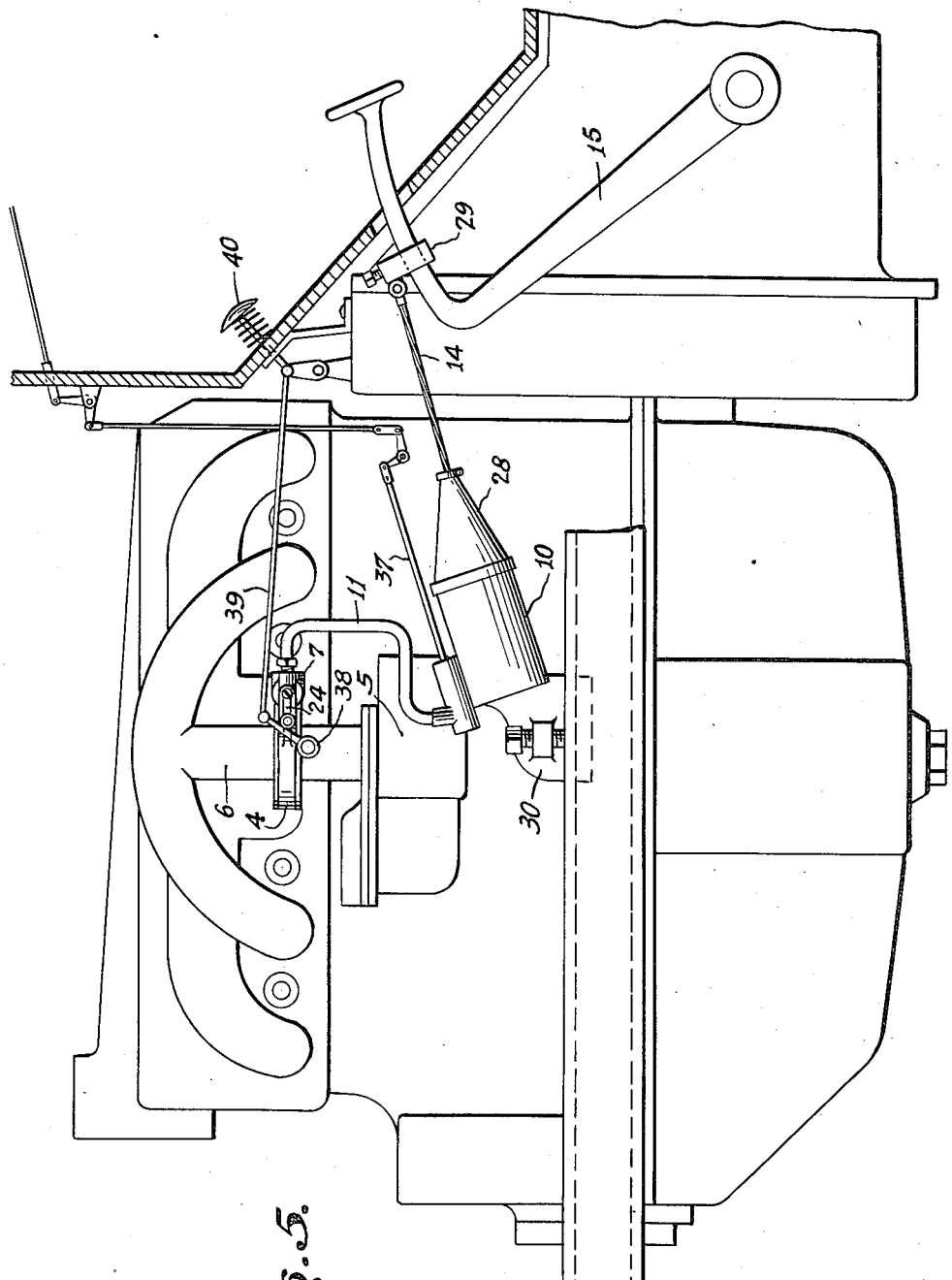

Patented Oct. 29, 1935

2,019,315

UNITED STATES PATENT OFFICE 2,019,315

CLUTCH OPERATING MECHANISM

Robert F. Metcalfe, Los Angeles, Calif.

Application May 8, 1931, Serial No. 535,938

6 Claims. (Cl. 192—0.01)

This invention relates to a power transmission system and more particularly to a device or clutch operating mechanism whereby the power may be connected or disconnected at will. In particular the improved invention has to do with power systems in which the source of power supply is an internal combustion engine of some form, the preferred form of the invention permitting the automatic connecting and disconnecting of the power at will depending upon the manner in which the engine is operated.

The main example which incorporates this invention is the motor driven vehicle and this invention permits the vehicle to do what is now known as free wheel or coast.

By free wheel is meant the automatic disengagement of the clutch at such times as the operator removes his foot from the accelerator thereby disengaging the engine from the drive shaft and permitting the vehicle to coast. At the same time it is apparent that the operator may shift gears without the necessity of operating the clutch.

It is obvious that a device of this character may be used in conjunction with other types of engines than internal combustion engines. In fact the invention may be used with any engine in which the fluid status of the fuel supply is such that it creates sufficient power whether pressure or vacuum to actuate a fluid motor which, in turn, is connected to a power transmission clutch. It is apparent that the above would include water or steam turbines, Diesel engines, compressed air engines, etc.

The invention in its preferred form is intended as an accessory to convert an ordinary motor vehicle into one having the free wheeling features. However, if desired, the device may be built into the automobile at the factory.

A main object of the invention is to provide a device for automatically operating the clutch mechanism to cause free wheeling of the automobile when the accelerator pedal reaches a predetermined position in its travel and to obtain this automatic operation by taking advantage of a condition existing in the engine when it is idling.

An object is to provide a device which will cause the clutch to be disengaged when the accelerator is released.

Another object of this invention is to provide a device which will be properly operated through the medium of the idling adjustment screw of the carburetor.

A further object is to provide a device which is operated by the vacuum created by the engine in the intake manifold.

Another object is to provide a valve having a metering port which will permit a uniform engagement of the clutch.

Another object is to provide a device which will be positive and substantially instantaneous in operation.

A still further object is to provide a device which may be made inoperative at will and to thus prevent the automatic effect or operation of free wheeling.

Another object is to provide a device which will be simple, inexpensive and easily manufactured.

A clearer conception of the construction, operation and further objects of the invention may be had from the following specification taken in conjunction with the accompanying drawings in which, Fig. 1 discloses the device installed on an automobile.

Fig. 2 is a detail view of a vacuum valve mechanism.

Fig. 3 is a view of the vacuum cylinder connected to the clutch operating lever.

Fig. 4 discloses the vacuum and bleeder valve in detail, and

Fig. 5 is an enlarged elevation of an automobile engine with the improved clutch mechanism of the present invention shown operatively mounted thereon.

The present invention contemplates in its main use an internal combustion engine for supplying power through a clutch to a driven member, and to have a means associated with the accelerator element of that engine for disengaging the clutch whenever the accelerator is moved to a predetermined position in its travel.

While the preferred example for the incorporation of the invention has to do with the connecting and disconnecting of the engine in a motor vehicle with the mechanism for driving the wheels thereof, it will be understood that the power from the engine may be employed for accomplishing any other desired type of work instead of driving the wheels, such, for instance as hoisting or tipping a freight carrying body or for other uses. The invention, for example, may also be incorporated with internal combustion engines employed in hoisting and digging apparatus or other desired purposes.

While in the preferred form of this invention, use is made of the vacuum created in the intake manifold by reason of the movement of the engine pistons, it will be understood that the fluid in this manifold is in condition to exert energy, i. e.—a vacuum, thus creating an energy supplying condition of the fluid. This condition is developed whether the motor is operating to produce power, or whether it is idling.

While the incorporation of the invention as herein disclosed as employing the vacuum for the movement of the clutch members, in the preferred example, it will be understood that fluid under pressure may be employed for accomplishing the same end, such, for instance, as harnessing the exhaust gases of the engine. These gases are under pressure as is well known. Also, a small accessory air pump might be added to the engine and driven thereby to separately give fluid in desired condition to operate the fluid motor. For this reason the improved invention set forth herein may be employed and operated, either by vacuum conditions, or by pressure conditions, both of which are found to be present in internal combustion engines during the running thereof, whether in power supplying condition, or whether in idling condition.

In the present invention it is proposed to employ a power condition existing in the engine; for instance, the vacuum created in the intake manifold which may be employed for operating a vacuum fluid motor which in turn manipulates the clutch. This vacuum is controlled by a valve under the direct control of the idling adjustment screw of the carburetor.

As is well known in the art, free wheeling of a vehicle is attained by some means which will disengage the engine from the drive shaft at a time when the operator allows the engine accelerator or control element to be moved to a definite position thereby permitting the vehicle to coast.

In the drawings a valve plate 4 is adapted to be connected between the carburetor 5 and the intake manifold 6 on the high vacuum side, i. e., above the butterfly valve. The plate 4 contains a bleeder and vacuum valve which is under the direct control of an idling screw 7 and opens and closes a path between ports 8 and 9. The port 9 is connected with a fluid motor by a pipe 11. The fluid motor comprising a cylinder 10 which contains a piston 12 connected by a cable 14 to the clutch pedal 15.

The valve plate 4 contains a valve formed as shown in Fig. 4 with a pilot 16 and faces 17 and 18.

The face 17 is adapted to close the bleeder port 19 and face 18 to close the vacuum port 8.

This valve is formed as shown with a bleeder port 19 in which is positioned a pilot 16 forming a metering orifice, the area of which is the differential of the diameter of the pilot and the port. This metering orifice controls the rate of engagement of the clutch providing a gradual application of the clutch spring pressure to assure uniform acceleration of the driven member of the clutch until a uniform speed of both members is obtained. As counter disposed there is the vacuum valve which is designed to establish communication between the vacuum area of the manifold and the fluid motor 10. The face 18 is formed circular and the seat thereby forming a line contact which when opened permits instantaneous admission of vacuum to cylinder 10. The whole valve causes a slow uniform engagement of the clutch through the action of the bleeder port and an almost instantaneous disengagement of the clutch by the action of the vacuum port.

Secured to, or formed therewith, is an actuating rod 20 the end of which is secured to a bearing block 21 (Fig. 2) slidably held in a hole 22 in the valve plate. The whole valve is confined in the valve plate by a disk 41 having port 19 formed therein. A flange 23 is formed on the plate 4 to which is pivoted a rocker arm 24. The end of this rocker arm is tapped to accommodate a machine screw 7 which replaces the normal idling adjustment screw of the carburetor.

The valve together with stem 20 and block 21 are forced against screw 7 by a spring 25 thereby closing port 8 and maintaining bleeder port 19 open until such time as the accelerator is released.

The fluid motor preferably comprises an open ended cylinder with a piston 12 fitted therein. The open end is provided with a spring steel expansion ring 26 snapped into a groove 27 cut in the inner face of the cylinder. The ring 26 forms a limit for piston 12 thereby permitting the removal thereof only upon removal of the ring. Secured to the outer face of the cylinder 10 in any well known manner is a flexible sleeve 28 formed of any suitable material which prevents dust and foreign matter from entering the cylinder. The sleeve is clamped at its outer end to 25 the cable 14 by any well known means.

The cable 14 is anchored in the piston 12 by any well known method such as upsetting and brazing or swaging, and the free end of the cable is pivotally secured to the clutch pedal 15 by a clamp 29.

The cylinder 10 is formed with a flange 30 having a clamping bolt associated therewith for securing the cylinder to the frame of the car.

The body of the cylinder 10 is provided with a port 31 communicating by means of port 32 to the vacuum line or by means of port 33 with the atmosphere. A suitable valve mechanism is provided whereby the vacuum from the intake manifold may be made ineffective when desired to dispense with free wheeling. This valve comprises a stem 34 and a cylindrical piston 35 having a reduced portion 36. The stem 34 is connected to a pull rod 37 which terminates on the dash board and is manually manipulated. With the cylinder 35 in the position shown in Fig. 3 the port 31 is open through the reduced portion 36 to the port 32, then the device is in condition to cause free wheeling. When the pull rod 37 is drawn out the lower end of cylinder 35 closes the port 32 and opens the port 33 to port 31 thereby admitting air at atmospheric pressure to permit the free movement of piston 12. The outer ends of port 9 and 32 are tapped to receive the ends of pipe 11 which may be of any suitable material preferably seamless metal tubing.

The operating lever 38 for the carburetor butterfly valve is shown in Figs. 1, 2 and 5 connected to accelerator 40 by rod 39 and any well known system of levers and springs (not shown). In Fig. 2 the lever 38 is shown bearing against the rocker.

In operation, this device makes use of the fact that a vacuum exists in the intake manifold whenever the engine is running, by providing a control means in the shape of a vacuum valve which causes the clutch to be disengaged whenever the butterfly valve lever 38 is in engagement with the rocker arm 24. It is, therefore, apparent that a vehicle may be started from standstill by merely shifting into lower gear and actuating the accelerator 40 which moves the lever 38 out of engagement with the arm 24 thereby permitting bleeder port 19 to open and admit air at atmospheric pressure to the cylinder 10.

As described above, port 19 is so formed that the clutch is gradually engaged until the motor and drive shaft are both moving at a uniform speed. To shift into second the operator merely releases the accelerator which permits lever 38 to engage arm 24 and thereby open vacuum port 9 permitting air at atmospheric pressure to force piston 12 into cylinder 10 thereby disengaging the clutch. This action is almost instantaneous due to the construction of valve face 18 as described above. After the gears have been shifted to second the clutch is engaged again as described above and the same operation repeated until the high speed gears are meshed.

Where it is desired to discontinue the free wheeling operation the pull rod 37 is actuated thereby covering port 32 and opening port 33. This admits atmospheric pressure to the cylinder 10 and prevents the admission of a vacuum through port 32 thereby placing the clutch under the operator's control.

From the foregoing description it is apparent that this device is positive and yet simple in operation and may be easily adapted for use on any engine, the fuel supply of which is capable of creating fluid power. The device is capable of low cost of manufacture and therefore within the range of everyone to have a simple device to materially reduce the cost of operating the automobile.

It will be further observed that the vacuum created by the engine when idling is employed without creating additional power requirements to give a beneficial result to keep the automobile under better control.

What I claim is:—

1. In a device of the type described, a valve for controlling a vacuum cylinder operatively connected to a clutch mechanism, said valve having a bleeder port and a vacuum port, a valve body having a pilot thereon, said pilot and bleeder port forming a metering orifice whereby said cylinder causes the gradual engagement of said clutch mechanism.

2. A device of the type described, a valve for controlling a vacuum cylinder operatively connected to a clutch mechanism, said valve having a bleeder port and a vacuum port, a valve body having a pilot thereon, said valve body being mounted on a valve stem and adapted to be operatively moved therewith, said pilot and bleeder port forming a metering orifice whereby said cylinder causes the gradual engagement of said clutch mechanism.

3. In a device of the type described, a valve for controlling a vacuum cylinder operatively connected to a clutch mechanism, said valve having a bleeder port and a vacuum port, a valve body having a pilot thereon, said pilot and bleeder port forming a metering orifice whereby air at atmospheric pressure is gradually admitted to bleed said vacuum cylinder.

4. In a device of the type described, a valve for controlling a vacuum cylinder operatively connected to the clutch mechanism, said valve having a bleeder port and a vacuum port, a valve body having a spherical face, said face being adapted to cooperate with said vacuum port in a line contact whereby said cylinder causes the instantaneous disengagement of said clutch.

5. In a device of the type described, a valve for controlling a vacuum cylinder operatively connected to a clutch mechanism, an intake manifold, a carburetor having an idling adjustment screw, said valve having a port communicating with said manifold, a valve body under control of said screw having a spherical face thereon, said face being adapted to cooperate with said port in a line contact thereby permitting communication with the vacuum in said manifold for causing said cylinder to instantaneously disengage said clutch.

6. In a device of the type described, a valve for controlling a vacuum cylinder operatively connected to a clutch mechanism, an intake manifold, a carburetor having an idling adjustment screw, said valve having a port communicating with said manifold, a valve body under control of said screw, having a spherical face thereon, said face being adapted to cooperate with said port in a line contact, thereby permitting communication with the vacuum in said manifold and said vacuum cylinder, said cylinder comprising a casting open at one end, forming a body portion, a piston movable in said cylinder, a vacuum port at the closed end of the cylinder, and control means for said port.

ROBERT F. METCALFE.